United States Patent [19]
Pecoraro et al.

[11] 3,896,871
[45] July 29, 1975

[54] COMPUTER CONTROLLED AUTOMATED BUILDING SYSTEM HAVING A MANUAL CONTROL MODE

[75] Inventors: Joseph K. Pecoraro, Buffalo Grove; Philip A. Deckowitz, Des Plaines; Norman E. Brunner, Barrington, all of Ill.

[73] Assignee: Powers Regulator Company, Skokie, Ill.

[22] Filed: Jan. 23, 1973

[21] Appl. No.: 325,973

[52] U.S. Cl. .............. 165/22; 235/151.1; 236/1 B; 236/78; 318/591
[51] Int. Cl... G05d 23/22; F24f 11/00; G05b 11/32
[58] Field of Search ........... 235/151.1, 151; 236/78, 236/1 B; 318/591, 563; 62/203; 165/24, 22

[56] References Cited
UNITED STATES PATENTS

| | | | |
|---|---|---|---|
| 3,662,276 | 5/1972 | Hyer | 318/591 X |
| 3,668,379 | 6/1972 | Roberts | 318/591 X |
| 3,716,096 | 2/1973 | Berrett et al. | 235/151.1 |

*Primary Examiner*—William E. Wayner
*Attorney, Agent, or Firm*—Charles E. Quarton, Esq.

[57] ABSTRACT

A computer controlled automated building system for controlling environmental conditioning equipment to maintain the interior environment within a building. The system has a manual control mode to permit an operator to control manually the system when a failure occurs in the computer or when it is desirable to operate the system in the absence of the computer. Thus, the manual control mode can be used to operate the system when the computer is being serviced and is consequently disconnected from the system. Switching means is utilized for transferring control from the computer to a manual control panel and isolating the computer from the manual control panel. Control of the system is accomplished through field lines that communicate with control points in the system. A line receiver is utilized to couple the field lines to the control points and prevents noise signals on the field lines from entering the control points. The line receiver includes energy storage means that is charged by a control signal on the field lines. After the storage means is charged by a control signal, the line receiver transfers the control signal to the control point. However, noise signals on the field lines are of insufficient duration to charge the energy storage means and activate the line receiver.

15 Claims, 4 Drawing Figures

COMPUTER CONTROLLED AUTOMATED BUILDING SYSTEM HAVING A MANUAL CONTROL MODE

The invention relates to an automated building system for controlling environmental conditioning equipment to maintain the interior environment within a building complex.

More particularly, the invention relates to an automated building system having a computer for controlling environmental equipment. The computer controls the environmental equipment in accordance with programmed routines contained in the computer and can monitor the system for alarm conditions. The environmental conditioning equipment in the system is also automatically controlled by the computer in response to data supplied by sensors in the system. Additionally, operator instructions can be entered into the computer for controlling the environmental equipment.

The automated building system also has a manual mode of operation that can be initiated automatically when failure of the computer occurs or which can be selected by an operator. In the manual mode of operation, the operator enters control instructions to the environmental conditioning equipment through a manual panel and also can monitor the operating condition of the equipment.

The system utilizes a switching means for transferring the system from the computer control mode to the manual control mode. The switching means isolates the computer from the manual control in order that a failure of circuitry in the computer will not prevent manual access to the environmental conditioning equipment and data sensors located at the control points in the system.

The automated building system includes a computer that communicates through field lines to the control points within the system. The control points comprise environmental conditioning equipment and data sensors to indicate environmental conditions being controlled by the system. The computer controls the system by addressing a particular control point and sending appropriate command signals to the control point. The command signals then operate the environmental equipment at a control point or cause data to be returned to the computer.

A line receiver is utilized for coupling the field lines in the system to the control points. The line receiver operates to couple control signals on the field line to the control points and to isolate the control points from noise signals that may be present on the field line. The line receiver includes energy storage means that is charged by a control signal on the field line. After the storage means is charged by a control signal, the line receiver transfers the control signal to the control point. However, noise signals on the field lines are of insufficient duration to charge the energy storage means and activate the line receiver.

Other features of the invention will become apparent from a review of the detailed description and the drawings. One form of the invention is demonstrated in the drawings in which.

Figure 1:
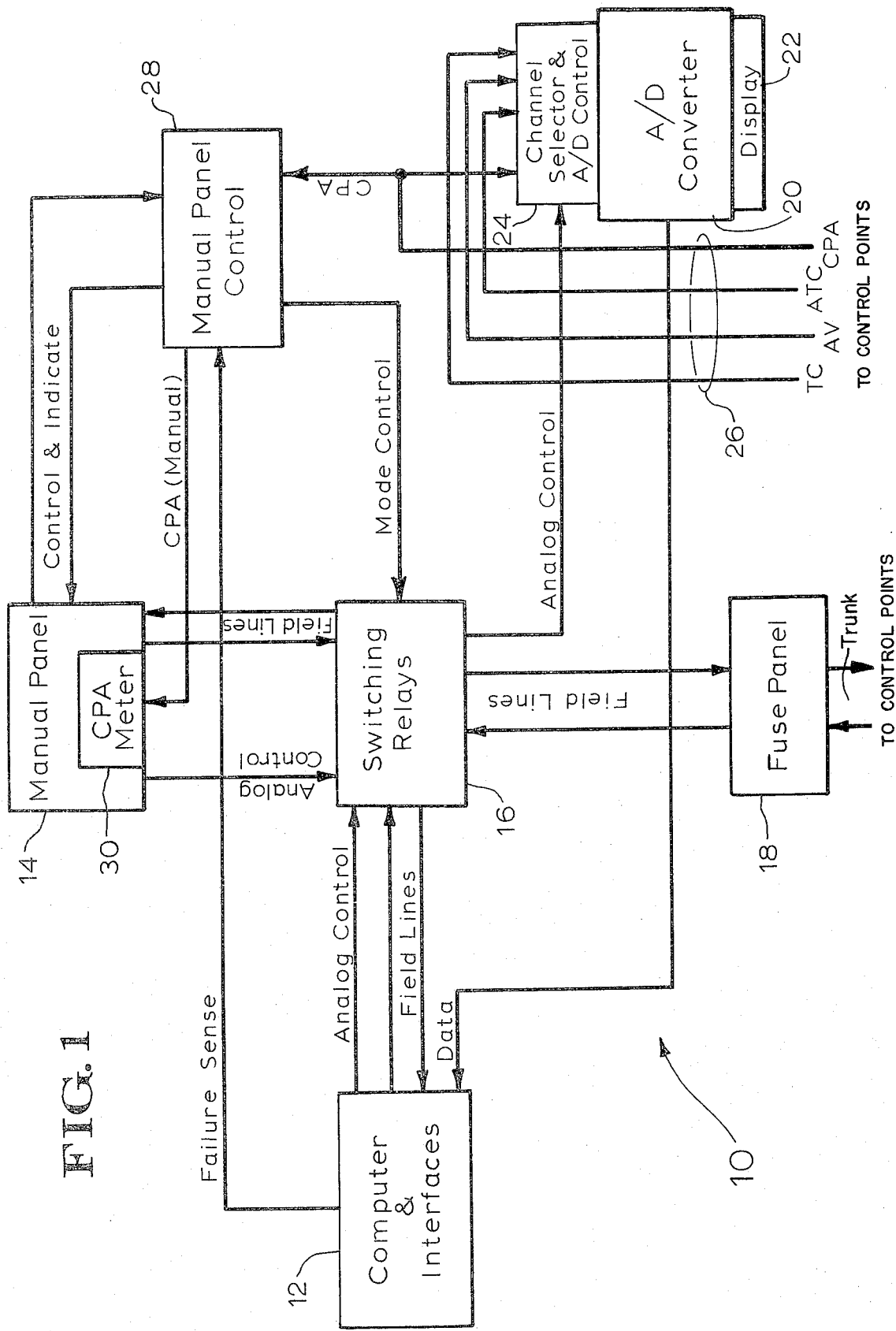
FIG. 1 is a schematic block diagram of an automated building system for controlling environmental conditions embodying the present invention.

Referring to FIG. 1, an automated building system embodying the present invention is indicated generally by the numeral 10. The automated building system 10 is utilized for controlling the environment in a large building. Also, the system can be used to control the environment in several buildings in a building complex, but for purposes of illustrating the invention, the system will be described with reference to a single building. The system 10 operates to control the various types of environmental conditioning equipment to maintain the proper interior environment within a building. For example, the system 10 can control the temperature of a building by operating various air heating units and air cooling units to maintain the interior temperature within the building. Also, the system 10 may be used to supply fresh air to the building, may control equipment for regulating the humidity of the interior air and may control equipment for removing impurities from the interior air.

The automated building system 10 includes a general purpose digital computer 12 for communicating with control points located within the building. The control points include environmental conditioning equipment and various types of data sensors for measuring environmental conditions. The computer 12 includes interfaces for communicating with the control points and receiving data from the control points. The computer 12 is programmed to monitor the field points and store system information on the operating conditions of the system. System information is processed by the computer 12 to detect alarm conditions existing in the system. Additionally, the computer 12 operates environmental conditioning equipment located at the field points in the system and can optimize the operation of the environmental conditioning equipment in the system. Various types of input equipment and output equipment are associated with the computer 12 but are not in this illustration of the invention.

The automated building system 10 may also be operated in a manual mode isolated from the control of the computer 12. A manual panel 14 is utilized for communicating with the control points and providing control instructions initiated by an operator in a manner similar to the computer 12. The manual panel 14 can be used when a failure occurs in the computer 12 or when the computer 12 is disconnected from the system, for example, to perform maintenance on the computer. Additionally, the manual panel 14 can be used during the initial start-up of the system 10 before the computer is operating in the system 10 to control the environmental conditioning equipment.

A system of switching relays 16 is utilized to transfer control of the control points from the computer 12 to the manual panel 14. The transfer of control by the switching relays 16 permits total isolation of the manual panel 14 from the computer 12. Thus, failures within the computer 12 will not prevent the manual panel 14 from being able to control the control points in the automated building system 10.

When the automated building system 10 is operating in the computer mode, the computer 12 is coupled by field lines to the switching relays 16. The switching relays 16 connect field lines from the computer 12 onto the fuse panel 18. The fuse panel 18 connects the field lines to the trunk through a plurality of fuses. The trunk is in turn connected to the control points in the environmental building system 10. The fuse panel 18 prevents electrical overloads placed on the trunk from damaging the automated building system. For example, if a maintenance man, working on equipment at a control point, accidentally places a 117 volt power source on the trunk, no damage will take place in the automated building system 10. In the absence of protection provided by the fuse panel 18, electrical overloads on the trunk would enter the computer 12 and destroy logic circuitry in the computer.

Analog data from the control points in the automated building system 10 is supplied on the analog lines 26 to an analog to digital converter 20. The analog lines 26 enter the analog to digital converter 20 through a channel selector and analog to digital control 24. The analog lines include a thermocouple line TC and an amplified thermocouple line ATC for receiving voltage signals from thermocouples located at particular control points within the automated building system 10. Additionally, an analog value line AV is provided for receiving analog signals from the control points. A control point adjustment line CPA is provided for supplying an analog signal representative of the setting of a control point adjustment device located at particular control points in the automated building system 10. The control point adjustment line is also coupled to the manual panel control 28 for use when the automated building system 10 is being operated in the manual mode.

In the computer mode, the computer 12 supplies analog control signals to the switching relays 16 which are connected to the channel selector and analog to digital control 24. The analog control signals from the computer 12 select one of the analog input channels and cause the analog to digital converter 20 to convert the analog signal on the selected one of the analog lines 26 to a digital signal. The digital data is then transferred from the analog to digital converter 20 to the computer 12 for processing by the computer.

Conversion of the automated building system 10 from the computer mode to the manual mode is initiated by the manual panel control 28 in response to a failure signal from the computer indicating that a failure has occurred in the computer. For example, if the power fails in the computer 12, a signal indicating computer failure is supplied to the manual panel control 28. Additionally, the computer 12 can have a diagnostic program for checking the operation of the computer to determine if the computer is operating correctly. The diagnostic program operates to set periodically an output flag to indicate that the computer is operating. If the output flag is not updated by the diagnostic program, then a signal can be supplied to the manual panel control 28 to indicate that a failure has occurred in the computer 12.

When the manual panel control 28 detects a failure in the computer 12, the manual panel control sends a mode control signal to the switching relays 16. The switching relays 16 then operate to disconnect the field lines and analog control between the computer 12 and the switching relays 16 and to connect the analog control and field lines between the manual panel 14 and the switching relays 16.

In the manual mode, the manual panel 14 supplies analog control through the switching relays 16 to the analog to digital control 24. The manual panel 14 is also coupled through the field lines to the switching relays 16 and onto the fuse panel 18. Thus, the manual panel has access through the trunk to the associated control points in the automated building system 10.

The manual panel control 28 can then be utilized by an operator to send control signals to the manual panel 14. The manual panel 14 transfers the control signals through the field lines to the control points. Additionally, indications provided by the control points can be supplied through the field lines to the manual panel 14 for transfer to the manual panel control 28. Data from the control points can also be observed in the manual mode.

The manual panel control 28 is used to generate an analog control signal that is sent through the manual panel 14 to the switching relays 16 and onto the analog to digital control 24. Thus, one of the analog lines 26 will be selected for presentation to the analog to digital converter 20. The digital value of the selected one of the analog lines 26 appears on the visual display 22 for observation by an operator. Thus, an operator can utilize the manual panel control to exercise control over the system 10.

During the operation of the automated building system 10 in the computer mode, the computer 12 controls the operation of the system in accordance with an operating program stored in the computer. Additionally, input instructions can be entered by an operator to the computer 12 on input equipment (not shown) associated with the computer. The computer 12 communicates with the control points in the automated building system by supplying an address to the control points through the field lines. The computer 12 can then receive information from the control points on the field lines. Additionally, if the control points has an analog sensor, analog signals will be supplied by the control point that is addressed on the analog lines 26. The computer sends analog control signals to the analog to digital control 24 to select the appropriate one of the analog lines 26. The analog signal, from the control point that is addressed, is converted by the analog to digital converter 20 to a digital signal and the digital data is transferred to the computer 12.

During the manual mode of operation for the automated building system 10, control of the system is exercised by an operator through the manual panel control 28. The manual mode of operation is initiated by the manual panel control 28 when a failure of the computer 12 is sensed or the manual mode is selected on the manual panel control. The manual panel control 28 supplies a mode control signal to the switching relays 16 and the switching relays operate to disconnect the field lines and analog control between the relays and the computer 12 and to connect the field lines and analog control between the relays and the manual panel 14.

With the system 10 operating in the manual mode, the operator enters control instructions on the manual panel control 28. In a typical operation, the operator enters a control point address on the manual panel control 28 and the field lines from the manual panel 14 are coupled to a particular control point represented by the address. The operator can then enter operating instructions for the particular control point that is addressed. For example, the operator can turn on a motor located at the control point. Additionally, information can be received from a particular control point on the field lines entering the manual panel 14. For example, information on whether control switches at the control point are open or closed can be supplied by the field lines to the manual panel 14. The manual panel 14 then signals the manual panel control to indicate the condition of the control switches.

If a control point being addressed includes analog data sensors, analog data signals will be present on the analog lines 26. In order to read the analog data from the control point being addressed, the operator enters analog control signals on the manual panel control 28 to select one of the analog lines 26. The manual panel 14 then transfers the analog control signals to the channel selector 24 of the analog to digital converter 20. The analog data signal from the addressed control point appearing on the selected one of the analog lines 26 can then be viewed in digital form on the visual display 22 by the operator.

If the particular control point being addressed includes a control point adjustment device, an analog signal respresenting the setting of the control point adjustment will be present on the CPA line. The operator can view the analog signal on the CPA meter 30 on the manual panel 14. Additionally, if desired, the operator can enter an analog control signal to cause the CPA analog value to appear on the visual display 22 of the analog to digital converter 20.

Therefore, it will be appreciated that an operator can exercise control over and monitor the various control points in the automated building system 10 when the system is operating in the manual mode. This permits the system 10 to be operated even though the computer 12 has failed or the computer has been removed from the system for maintenance or other purposes.

Figure 2:
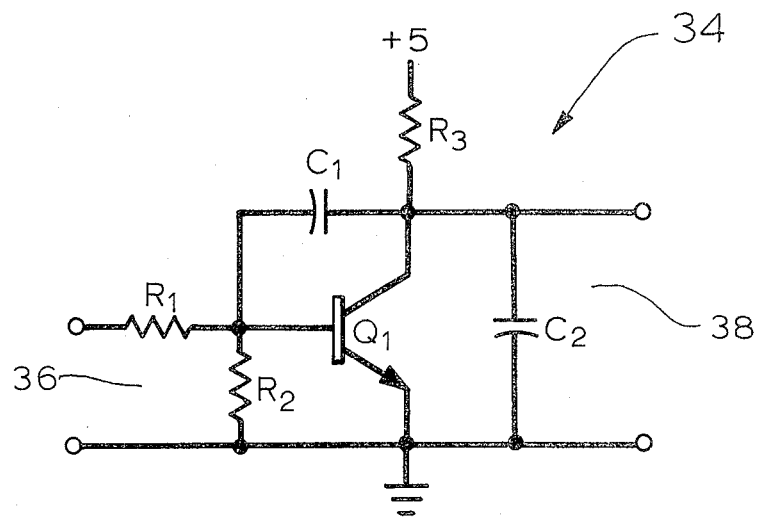
FIG. 2 is a detailed circuit diagram of a line receiver circuit utilized in the automated building system of the present invention.

Referring to FIG. 2, a line receiver circuit 34 that is used for coupling the field lines to the control points in the automated building system 10 is illustrated. The line receiver circuit 34 receives control signals from the field line and transfers a control signal on the field line to the control point with which the line receiver circuit is associated. The line receiver circuit 34 includes an energy storage means that is charged by control signals appearing at the input of the circuit. The charging of the energy storage means delays the operation of the circuit in transferring the control signal on the field lines to the control point. Noise signals on the field lines are of insufficient duration to charge the energy storage means in the line receiver circuit 34. Thus, the line receiver circuit 34 operates to isolate the control point from noise signals appearing on the field lines and to prevent loading of the field lines by the control points. As a result, the line receiver circuit 34 permits relatively long lengths of field lines to be used for communicating with the control points.

Figure 3:
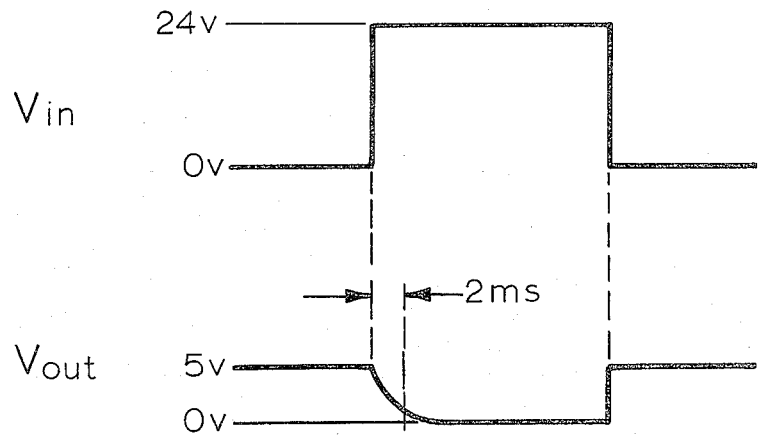
FIG. 3 is a pulse diagram illustrating the operation of the line receiver circuit shown in FIG. 2.

Referring to FIG. 3, when an input signal is generated on the field lines in the form of a voltage pulse and applied to the input of the line receiver circuit 34, the output voltage of the line receiver circuit 34 changes slowly from a high level to a low level as the energy storage means is charged. Typically, there is approximately a 2 millisecond delay in the transition of the line receiver circuit 34 from a high level to a low level. Thus, noise pulses which are typically of a short duration considerably less than the 2 millisecond input transition of the circuit 34 do not operate to activate the circuit.

Referring to FIG. 2, the line receiver circuit 34 includes a switching transistor Q31 that changes from an off condition to an on condition when a trigger-level voltage is applied to the base of the transistor Q1. Resistors R1 and R2 are connected to the input of the transistor Q1 and serve as a voltage divider on the input of the transistor. The resistors R1 and R2 operate to raise the input voltage level required at the input 36 to supply a trigger-level voltage to the base of the transistor Q1. A resistor R3 couples the collector of the transistor Q1 to a source of voltage, that is preferably five volts. However, other voltage sources can be utilized depending on the voltage level of the logic to be activated by the output voltage of the transistor Q1. An input capacitor C1 is connected between the base of the transistor Q1 and the collector of the transistor. An output capacitor C2 is coupled between the collector and the emitter of the transistor Q1.

The operation of the line receiver circuit 34 is illustrated in FIG. 3. When the input 36 of the line receiver circuit is at zero volts, the base of the transistor Q1 is at zero volts and the transistor is turned off. As a result, the output 38 of the line receiver is held at 5 volts through the resistor R3. When the input 36 receives a signal pulse of 24 volts, the base of the transistor Q1 is held initially at zero volts by the input capacitor C1. The input capacitor C1 then begins to charge and when the base of the transistor Q1 reaches the trigger-level voltage, the transistor Q1 is turned on. The transistor Q1 then applies ground to the resistor R3 and the output 38 of the line receiver is held at zero volts. Thus, the input capacitor C1 comprises an energy storage means that is charged by an input signal to the line receiver circuit 34, to delay activation of the circuit.

The time required for the line receiver 34 to respond to the input voltage is preferably about 2 milliseconds and can be controlled by adjusting the value of the input capacitor C1. Therefore, the value of the input capacitor C1 can be varied so that the charging time for the input capacitor exceeds the duration of noise signals at the input 36 to prevent triggering of the line receiver circuit 34 by noise signals.

When the signal voltage applied to the input 36 of the line receiver circuit 34 is changed from 24 volts to zero volts, the transistor Q1 is turned off and the output 38 changes from zero volts to 5 volts. This transition is relatively rapid compared with the high to low transition of the line receiver 34 and is controlled by the value of the resistor R3 and the capacitor C2.

It will be appreciated that the line receiver circuit 34 can be modified to operate with input voltage levels other than 24 volts and zero volts by varying the value of the resistors R1 and R2 that operate as a voltage divider, as long as the input voltage is sufficient to reach the trigger level of the switching transistor Q1. Additionally, the collector voltage of the switching transistor Q1 can be at a level other than 5 volts depending on the requirements of the circuitry to be driven by the line receiver circuit. Also, the line receiver circuit 34 can be operated with negative voltage levels by using an NPN type switching transistor instead of the PNP type switching transistor Q1 that is illustrated.

Figure 4:
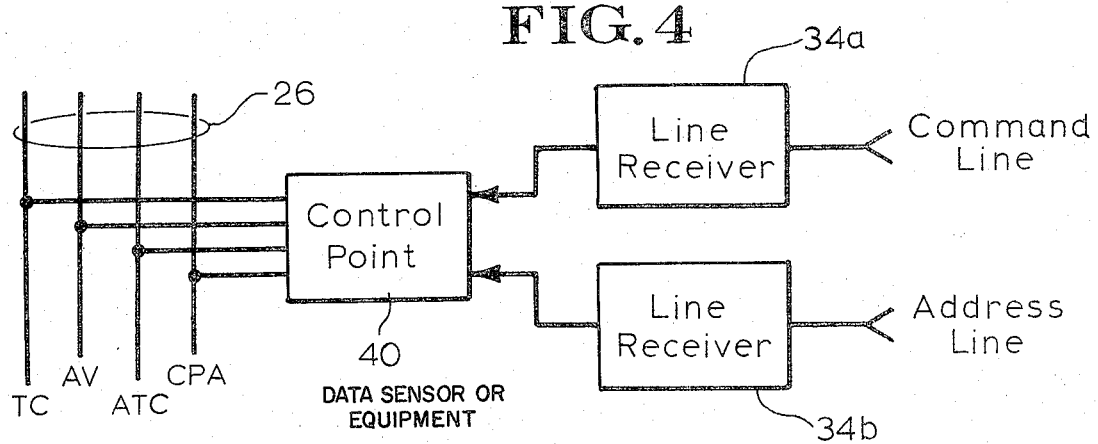
FIG. 4 is a schematic diagram illustrating the use of the line receiver circuit of FIG. 2 in the automated building system of the present invention.

Referring to FIG. 4, the use of the line receiver circuit 34 in the automated building system 10 is illustrated. Line receivers 34a and 34b are utilized to couple the command line and address line, respectively, contained in the system 10, to a control point 40. The control point 40 represents a typical control point having a data sensor for supplying an analog signal to the analog lines 26. Additionally, the line receiver can be utilized with control points in the system 10 that have environmental conditioning equipment to be controlled.

In the operation of the automated building system 10, a control signal is generated on the address line by the computer 12 or the manual panel control 28 and is supplied to the line receiver 34b. The line receiver 34b responds and provides a signal to logic associated with the control point 40. The control point 40 responds by coupling data sensors at the control point 40 to the analog lines 26, and thus, supplying an analog signal on the appropriate one of the analog lines 26. A control signal is generated on the command line, by the computer 12 or the manual panel control 28, and is supplied to the line receiver 34a. The line receiver 34a responds and provides a signal to logic associated with the control point 40. The command line signal causes the control point 40 to execute the appropriate command. For example, if the control point 40 is a control point adjustment, the signal on the command line can be utilized to adjust the control point setting. The CPA line will then carry an analog signal back to the computer 12 to indicate the particular setting of the control point 40.

It is to be understood that various modifications can be made to the disclosed automated building system without departing from the scope of the invention, and it is intended to cover in the appended claims all such modifications as fall within the true spirit and scope of the invention.

What is claimed is:

1. An automated building system for controlling the environmental conditions in a building comprising:
   a plurality of control points, said control points having environmental conditioning equipment for maintaining environmental conditions at a desired level in a building and data sensors for sensing environmental conditions associated therewith;
   a computer for generating control signals to operate environmental conditioning equipment associated with said control points and for receiving data from said control points;
   manual control means for generating control signals to operate environmental conditioning equipment associated with said control points and to obtain data from said control points;
   switching means for receiving control signals generated by said computer and control signals generated by said manual control means, said control points being coupled to said switching means, said switching means transferring control signals from said computer to said control points in a computer mode and transferring control signals from said manual control means in a manual mode.

2. The automated building system of claim 1 further including means for generating a mode control signal, said mode control signal being coupled to said switching means and causing said switching means to switch from said computer mode to said manual mode.

3. The automated building system of claim 1 further including means for sensing a failure in said computer and generating a mode control signal, said mode control signal being coupled to said switching means and causing said switching means to switch from said computer mode to said manual mode.

4. The automated building system of claim 1 further including an analog to digital converter, said analog to digital converter receiving analog data from said control points and supplying a digital data signal to said computer.

5. The automated building system of claim 4 wherein said analog to digital converter is coupled to said switching means, said switching means transferring analog control signals from said computer to said analog to digital converter in said computer mode and transferring analog control signals from said manual control means to said analog to digital converter in said manual mode.

6. The automated building system of claim 5 wherein said analog to digital converter has a plurality of input channels for receiving analog signals.

7. The automated building system of claim 6 wherein said analog to digital converter has a visual display for displaying a digital value corresponding to an analog signal received by said analog to digital converter.

8. The automated building system of claim 1 further including fuse panel means for protecting said switching means from electrical overloads, said control points being coupled to said switching means through said fuse panel means.

9. The automated building system of claim 1 further comprising a line receiver associated with said control points and having an input for receiving control signals transferred from said switching means to said control points, said line receiver including energy storage means coupled to the input of said line receiver, said energy storage means being charged by signals applied to said input and activating said line receiver to couple a control signal on said input to the associated control point after a predetermined energy level is attained in said energy storage means.

10. The automated building system of claim 9 wherein said line receiver includes a switching transistor, said switching transistor being turned on when the predetermined energy level is attained in said energy storage means.

11. An automated building system for controlling the environmental conditions in a building comprising:
    a plurality of control points, said control points having environmental conditioning equipment for maintaining environmental conditions at a desired level in a building and data sensors for sensing environmental conditions associated therewith;
    means for generating control signals to operate environmental conditioning equipment associated with said control points and for receiving data from said control points; and
    a line receiver having an input for receiving control signals from said generating means and being coupled to an associated control point, said line receiver including energy storage means coupled to the input of said line receiver, said energy storage means being charged by signals applied to the input of said line receiver, and means for supplying an output signal to said associated control point, said energy storage means activating said means for supplying an output signal after a predetermined energy level is attained in said energy storage means.

12. The automated building system of claim 11 wherein said means for supplying an output signal comprises a switching transistor.

13. The automated building system of claim 12 wherein said energy storage means comprises an input capacitor, said input capacitor being coupled to the base of said switching transistor.

14. The automated building system of claim 13 wherein the collector of said switching transistor is coupled to a source of electric potential.

15. The automated building system of claim 13 wherein said line receiver includes a plurality of resistors coupled to the input of said line receiver to form a voltage divider for signals applied to said input.

* * * * *